United States Patent
Lee et al.

(10) Patent No.: US 12,126,061 B1
(45) Date of Patent: Oct. 22, 2024

(54) AMMONIA-BASED SOLID OXIDE FUEL CELL (SOFC) SYSTEM IN WHICH TEMPERATURE RISE USING HEATING ELEMENT IS APPLIED, AND OPERATION METHOD THEREFOR

(71) Applicant: WONIK MATERIALS CO., LTD., Cheongju-si (KR)

(72) Inventors: Kyoung Jin Lee, Cheongju-si (KR); Suk Yong Jung, Cheongju-si (KR); Young Lae Kim, Sejong (KR); Byeong Ok Cho, Cheongju-si (KR)

(73) Assignee: WONIK MATERIALS CO., LTD., Cheongju-si (KR)

( * ) Notice: Subject to any disclaimer, the term of this patent is extended or adjusted under 35 U.S.C. 154(b) by 0 days.

(21) Appl. No.: 18/711,258

(22) PCT Filed: Oct. 7, 2022

(86) PCT No.: PCT/KR2022/015091
§ 371 (c)(1),
(2) Date: May 17, 2024

(87) PCT Pub. No.: WO2023/096145
PCT Pub. Date: Jun. 1, 2023

(30) Foreign Application Priority Data

Nov. 25, 2021 (KR) .................. 10-2021-0163903

(51) Int. Cl.
| | | |
|---|---|---|
| *H01M 8/04* | (2016.01) | |
| *C01B 3/04* | (2006.01) | |
| *H01M 8/04007* | (2016.01) | |
| *H01M 8/04082* | (2016.01) | |
| *H01M 8/04223* | (2016.01) | |
| *H01M 8/04225* | (2016.01) | |
| *H01M 8/0606* | (2016.01) | |
| *H01M 8/1231* | (2016.01) | |

(Continued)

(52) U.S. Cl.
CPC ......... *H01M 8/04268* (2013.01); *C01B 3/047* (2013.01); *H01M 8/04037* (2013.01); *H01M 8/04201* (2013.01); *H01M 8/04225* (2016.02); *H01M 8/04231* (2013.01); *H01M 8/0606* (2013.01); *H01M 8/1231* (2016.02); *H01M 8/222* (2013.01); *H01M 2008/1293* (2013.01)

(58) Field of Classification Search
CPC ........... H01M 8/04268; H01M 8/1231; H01M 8/04225; H01M 8/04037; H01M 8/04201
See application file for complete search history.

(56) References Cited

U.S. PATENT DOCUMENTS

| | | | | |
|---|---|---|---|---|
| 2022/0416273 A1* | 12/2022 | Ozawa | ............. | H01M 8/04753 |
| 2023/0343978 A1* | 10/2023 | Okada | .................... | C25B 13/07 |

FOREIGN PATENT DOCUMENTS

| | | |
|---|---|---|
| JP | 2003-132926 A | 5/2003 |
| JP | 2020-098699 A | 6/2020 |
| JP | 2020-098759 A | 6/2020 |

(Continued)

*Primary Examiner* — Olatunji A Godo
(74) *Attorney, Agent, or Firm* — You & IP, LLC

(57) ABSTRACT

The present invention relates to a solid oxide fuel cell (SOFC) system in which ammonia is applied and, more specifically, to: an ammonia-based SOFC system which is mobile and in which heating element temperature rise allowing a COx-free and NOx-free eco-friendly system is applied; and an operation method therefor.

9 Claims, 6 Drawing Sheets

(51) Int. Cl.
*H01M 8/22* (2006.01)
*H01M 8/12* (2016.01)

(56) References Cited

FOREIGN PATENT DOCUMENTS

| | | |
|---|---|---|
| JP | 2020-132496 A | 8/2020 |
| KR | 10-1268846 B1 | 5/2013 |
| KR | 10-2159237 B1 | 9/2020 |
| KR | 10-2254196 B1 | 5/2021 |

* cited by examiner

AMMONIA-BASED SOLID OXIDE FUEL CELL (SOFC) SYSTEM IN WHICH TEMPERATURE RISE USING HEATING ELEMENT IS APPLIED, AND OPERATION METHOD THEREFOR

TECHNICAL FIELD

The present invention relates to a solid oxide fuel cell (SOFC) system using ammonia, and more particularly, to an ammonia-based SOFC system in which temperature rise by a heating element is applied, as a portable, COx-free, eco-friendly system, and a method of operating the same.

BACKGROUND ART

Recently, interest in using renewable energy such as wind and solar energy is growing to curb greenhouse gas emissions that cause global warming. However, renewable energy has a limited area of use, so there is a trend being developed in the form of a system that produces electricity in areas with high energy efficiency such as solar power, uses this to produce hydrogen or ammonia, and transports the hydrogen or ammonia as a hydrogen energy source.

In particular, ammonia is a compound composed of hydrogen and nitrogen and has the advantage of not generating carbon-based pollutant gas compared to using hydrocarbon-based fuel. However, using ammonia again as hydrogen energy requires passing through a reformer that separates hydrogen in a high temperature environment. The reformer is a device that is installed separately from a fuel cell stack in which multiple cells are stacked and generates hydrogen from ammonia. This reactor is usually fixed to the outside, and the generated hydrogen is supplied to the fuel cell through a pipe. In order to operate the reformer, LNG or LPG-based fuel containing carbon is mainly used to supply heat up to the decomposition reaction start temperature (Patent Document 1, KR 10-2159237B1, 2020.09.23.).

Additionally, in a high-temperature SOFC system using ammonia as fuel, it is difficult to raise the initial temperature only by igniting ammonia gas. Therefore, for the initial operation of SOFCs at high temperatures above about 650° C., LNG or LPG-based fuel containing carbon is used to raise the temperature.

In operating the high-temperature SOFC system using ammonia as fuel, the generation of COx and NOx, which are environmental pollutants, cannot be avoided. However, in relation to current climate issues, COx-free and NOx-free eco-friendliness is required in energy-related industries. In order to apply the entire fuel cell system as COx-free and NOx-free in an eco-friendly manner, a COx and NOx removal device must be additionally installed in the reformer and fuel cell.

Meanwhile, the SOFC that use ammonia as fuel may be located in a fixed location, but depending on the field of application, for example, when small-scale power generation such as distributed power generation is required, mobility may be an important key.

Therefore, in order to expand its use, it is necessary to develop a high-temperature SOFC system fueled by ammonia that is COx-free and NOx-free, eco-friendly, can easily supply hydrogen, and has system mobility.

DISCLOSURE

Technical Problem

The present invention is intended to provide an ammonia-based solid oxide fuel cell (SOFC) system and a method of operating the same. The SOFC system is a high-temperature fuel cell using ammonia fuel, is used for small-scale power generation such as distributed power generation, and allows heat required for initial operation to be supplied in an environmentally friendly manner without emitting pollutants such as COx or NOx. In addition, the SOFC system enables ammonia reforming integrated with the fuel cell and applies temperature rise by a heating element, thus having mobility.

Technical Solution

In order to solve the above-mentioned problem, an ammonia-based solid oxide fuel cell (SOFC) system in which temperature rise by a heating element is applied, according to the present invention, includes an insulation box module (a); and a BOP module (b).

The insulation box module (a) is a part related to power generation and includes a fuel cell stack 9, an upper manifold 10, a lower manifold 8, a heating element 11, and a conductor wire 12 for the heating element to supply electricity to the heating element 11. The components 8 to 11 are located inside the insulation box module (a), and the conductor wire 12 for the heating element is located outside the insulation box module (a).

The balance of plant (BOP) module (b) is a supporting component and auxiliary system necessary for power generation, such as delivering energy in addition to a power generation device, and includes an inert gas supply device 1, an ammonia supply device 2, a cooling water supply device 3, a stack air supply device 4, a discharge hot water processing device 5, heat exchangers 6-2 to 6-6, a current collect device 13, a heating element controller 14, and an inverter 15.

A method of operating the ammonia-based solid oxide fuel cell (SOFC) system in which temperature rise by the heating element is applied, and which includes an insulation box module (a); and a BOP module (b), is characterized by including the following two steps:
  i) a first step of raising the temperature of the fuel cell stack to the operating start temperature by allowing heat from the heating element heat source to circulate throughout the fuel cell stack; and
  ii) after the first step, a second step of producing power, that is, applying current, by supplying ammonia to the fuel supply line of the lower manifold.

The first step is a purge step inside the fuel cell stack and the fuel supply line, and a temperature rise step inside the fuel cell stack and the fuel supply and air supply lines.

Specifically, in the first step, in order to purge the inside of the fuel cell stack and the fuel supply line, an inert gas is supplied to the fuel supply line of the lower manifold to remove residual oxygen and/or impurities that may exist inside the fuel cell stack and the fuel supply line. The residual oxygen and impurities may react with ammonia, which is a fuel, and may cause a decrease in efficiency of power production using ammonia.

In order to raise the temperature of the fuel cell stack and the fuel supply and air supply lines, the heating element heat source located under the lower manifold and on the three lateral sides of the stack: (1) acts on the stack to raise the temperature of the stack to the operating start temperature, and (2) acts on the lower manifold to raise the temperature of the air and the inert gas flowing through the air supply line and the fuel supply line of the lower manifold, respectively, so that heat from the heating element heat source is circulated throughout the fuel cell stack, and thereby the temperature of the fuel cell stack is raised to the operating start temperature.

The heating element heat source for the temperature rise receives power from the current collect device 13, and the degree of the heat source acting on the stack and the lower manifold is adjusted using the heating element controller 14.

The operating start temperature of the stack is about 600° C. or higher, preferably 650° C. to 700° C.

The three sides of the stack where the heating element heat source 12 is located refer to both lateral sides and the rear side, which are the remaining three sides of the stack except the front side where the stack faces the BOP module, among the four sides surrounding the stack.

The second step is a step of producing power. The supply of inert gas to the fuel supply line of the lower manifold in the first step is stopped, ammonia is supplied, and the stack begins to operate by temperature rise in the first step, thereby producing power.

After the stack begins to operate, the stack can reach the continuous normal operating temperature of 700° C. to 750° C. without the heat source of the heating element due to heat generated by the electrochemical reaction that occurs during power production through continuous operation. As such, when the stack reaches the continuous normal operating temperature, the power applied from the current collect device 13 to the heating element of the first step is gradually adjusted to maintain the temperature of the stack at 700° C. to 750° C.

Meanwhile, the inside of the fuel supply line of the lower manifold is filled with a catalyst for ammonia reforming, so that after raising the temperature of the fuel supply line in the first step, ammonia is reformed in the fuel supply line when ammonia is supplied in the second step.

Advantageous Effects

The ammonia-based solid oxide fuel cell (SOFC) system of the present invention in which temperature rise by the heating element is applied is configured with an integrated stack-reformer that does not require a separate reformer by filling the inside of the fuel supply line of the lower manifold with the catalyst for ammonia reforming. Therefore, compared to a conventional system that requires a separate reformer, expensive facilities such as a reformer are not required, resulting in a significant economic effect.

In addition, the stack-reformer integrated configuration as mentioned above offers the advantage of mobility when producing small-scale power such as for distributed power generation.

Also, the ammonia SOFC system of the present invention has the advantage of being environmentally friendly as a COx-free and NOx-free system because of using an electric heating element.

In particular, since the ammonia SOFC system of the present invention does not require a separate reformer and does not require a separate burner to raise the temperature of the stack to the initial operating temperature, the system module can be configured as densely as possible. As a result, energy loss is reduced, which has the effect of increasing the overall energy efficiency of the SOFC system.

MODE FOR INVENTION

Hereinafter, the present invention will be described in detail to facilitate understanding of the present invention. Terms and words used in this description and claims should not be construed as limited to their usual or dictionary meanings, but should be construed with meanings and concepts consistent with the technical idea of the present invention, based on the principle that an inventor can appropriately define the concept of a term in order to explain his or her invention in the best way possible.

The present invention provides an ammonia-based solid oxide fuel cell (SOFC) system in which temperature rise by a heating element is applied. The SOFC system is a high-temperature fuel cell using ammonia fuel, is used for small-scale power generation such as distributed power generation, and allows heat required for initial operation to be supplied. In addition, the SOFC system has a reformer-like configuration integrated with the fuel cell stack and capable of reforming ammonia, ensuring mobility.

Figure 3:
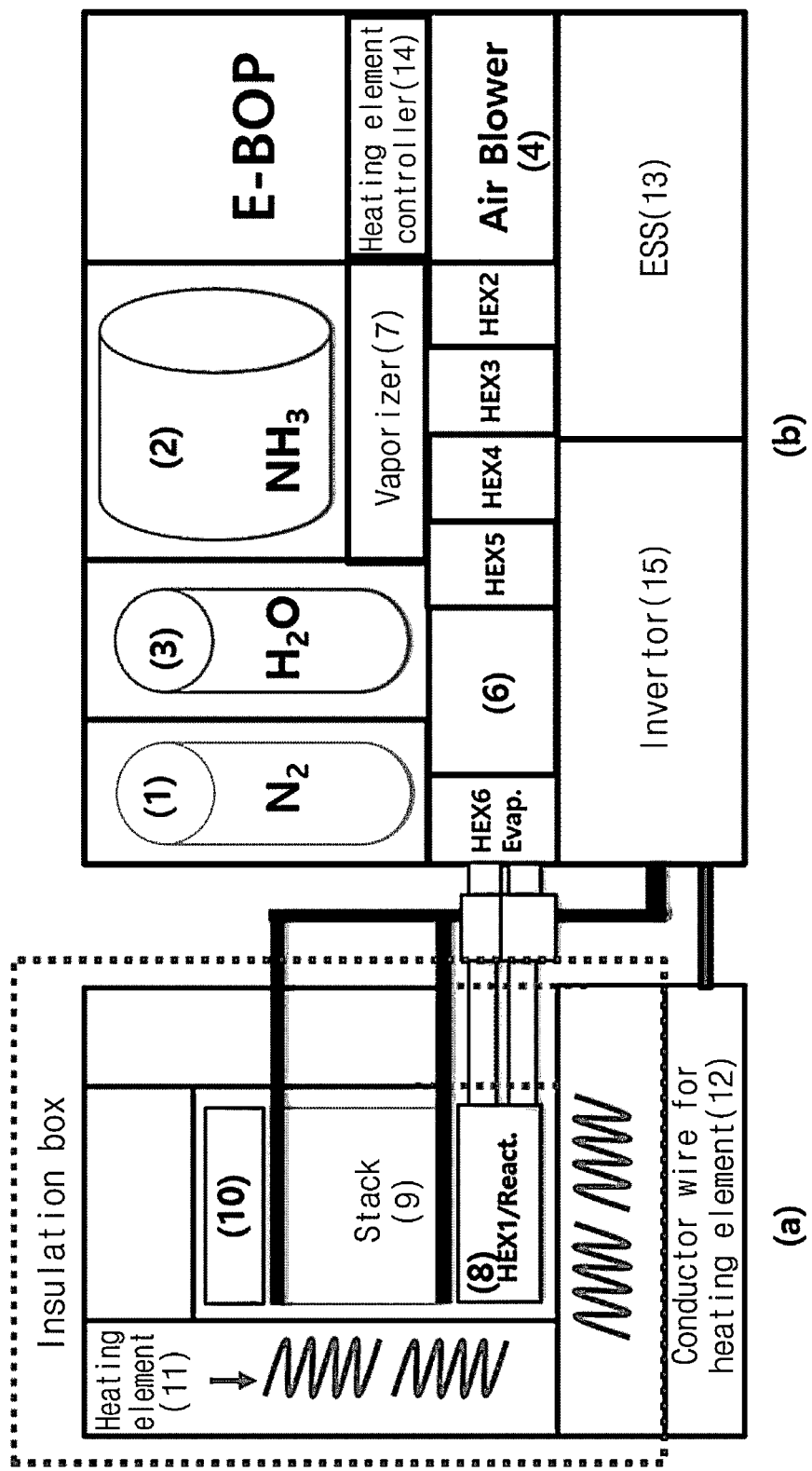
FIG. 3 schematically shows the configuration of a high-temperature fuel cell system whose temperature is raised by a heating element of the present invention.

The ammonia-based solid oxide fuel cell (SOFC) system in which temperature rise by a heating element is applied includes an insulation box module (a), and a BOP module (b) (see FIG. 3).

The insulation box module (a) is a part related to power generation and includes a fuel cell stack 9, an upper manifold 10, a lower manifold 8, a heating element 11, and a conductor wire 12 for the heating element to supply electricity to the heating element. The components 8 to 11 are located inside the insulation box module (a), and the conductor wire 12 for the heating element is located outside the insulation box module (a).

The fuel cell stack 9 is a device that produces power through an electrochemical reaction using hydrogen from ammonia fuel and oxygen from air. Typically, the stack is a multi-layered stack of cells composed of electrodes made of metal/ceramic material and electrolytes. Depending on the cell area and the number of stacks, a stack that produces small power (for distributed power generation) can be used.

The upper manifold 10 is a typical component for the fuel cell stack and serves to circulate fuel still unreacted in the cell, among fuel and air supplied to the cell from the lower manifold, back to the cell.

The lower manifold 8 supplies fuel and air for the electrochemical reaction in the stack 9. The fuel and air are supplied through a fuel supply line and an air supply line, respectively (see FIG. 5).

The air supply line and the fuel supply line may be located in upper and lower portions of the lower manifold, respectively.

The inside of the fuel supply line through which ammonia is supplied as the fuel is filled with a catalyst that generates hydrogen by decomposing ammonia as the fuel.

The fuel supply line through which ammonia is supplied is located in the lower portion of the lower manifold and is heated to about 600° C. or more by a heat source of the heating element located under the lower manifold. As the temperature of the fuel supply line rises, ammonia which is the fuel supplied via the fuel supply line is decomposed by the ammonia decomposition catalyst filled in the fuel supply line to generate hydrogen (hydrogenation reforming reaction of ammonia). The generated hydrogen is supplied to the stack and undergoes an electrochemical reaction with oxygen in the air supplied via the air supply line, thereby generating power in the stack.

Figure 4:
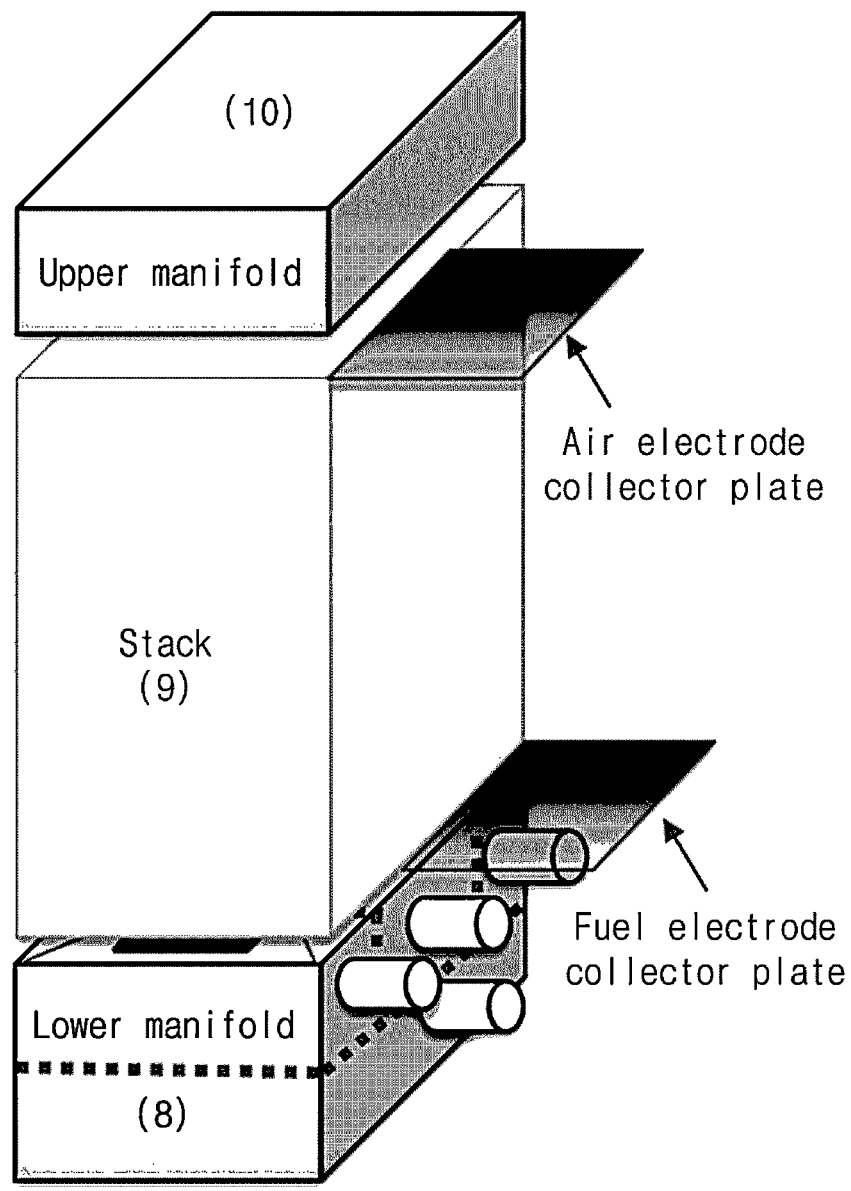
FIG. 4 schematically shows the structure of the high-temperature fuel cell stack of the present invention.

The fuel supply line may be implemented in a form where a vaporizer and the lower manifold are connected by piping (see FIGS. 3 and 4).

Figure 2:
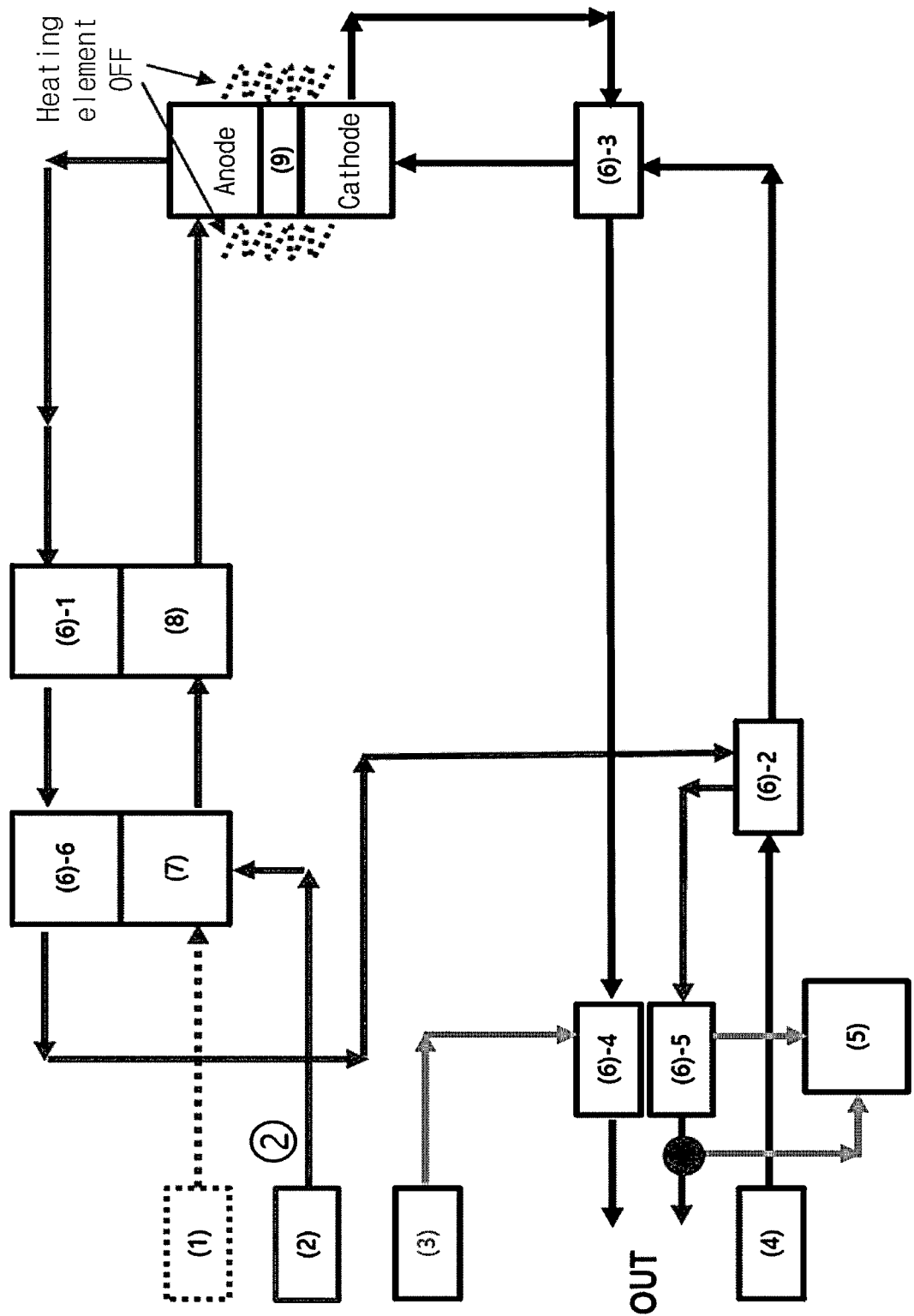
FIG. 2 schematically shows the flows of an ammonia fuel and air in the ammonia SOFC system in the second operation step of the present invention.

In addition, high-temperature exhaust gases (fuel and air) generated by stack operation at a high temperature move through the lower manifold of the stack (see FIG. 2). Therefore, the heat contained in the lower manifold due to the high-temperature exhaust gas itself acts as a heat exchanger 6-1 by raising the temperature of the fuel and air supplied from the BOP module to the lower manifold.

That is, the heat exchanger 6-1, which is the lower manifold itself, is connected to heat exchangers 6-2 to 6-6 of the BOP module, circulates the high-temperature exhaust gas generated after operation in the stack to the BOP module, and delivers it to provide the fuel and air. It is therefore possible to maximize the efficiency of the overall system.

The heat exchangers 6-2 to 6-6 are heat insulated from an air blower, a fuel tank, and electrical equipment side of the BOP module where the high-temperature exhaust gas is circulated, and a cooling fan may be additionally installed if necessary.

In addition, after the operation of the stack, the heat contained in the lower manifold may be added to the heat source of the external heating element as a heat source for the hydrogenation reforming reaction of ammonia or used without the heat source of the external heating element. Thus, it may further maximize the efficiency of the overall system.

Any catalyst containing common non-metals and noble metals may be used as the decomposition catalyst for the hydrogenation reforming reaction of ammonia. In particular, the catalyst may contain any one or more of metals and metal oxides including Al, Mo, Ni, Ru, Ce, etc., which have catalytic activity. The catalyst operates at temperatures ranging from room temperature to 800° C., and the characteristics of the catalyst, such as its composition and type, and the amount used may be determined depending on the required ammonia conversion rate.

The heating element 11 is a device for supplying heat to the stack and the lower manifold. The heating element is located on both lateral sides and the rear side (opposite of the front side) of four sides of the stack except for a side (the front side) facing the BOP module, and supplies heat to the stack to raise temperature up to the stack's initial operating temperature. In addition, the heating element 11 is located under the lower manifold, that is, under the lower portion of the lower manifold where the fuel supply line is located, and supplies heat to the fuel supply line. Due to this supplied heat, ammonia is decomposed by the ammonia decomposition catalyst filled inside the fuel supply line to generate hydrogen.

As described above, the fuel supply line acts as the ammonia reformer in which ammonia is decomposed by the catalyst.

Since the fuel supply line acts as the reformer as described above, the ammonia-based solid oxide fuel cell (SOFC) system of the present invention in which the temperature is raised by the heating element does not require an expensive, complex, and large separate reformer as in the prior art. Therefore, the system equipment is economical and also has the advantage of portability.

The conductor wire 12 for supplying electricity to the heating element is a conductive wire that supplies electricity for generating heat in the heating element. The conductor wire is connected to a current collect device 13 of the BOP module to supply electricity, and the amount of electricity supplied may be adjusted by setting of a heating element controller. The heating element controller 14 may be installed where necessary.

Figure 6:
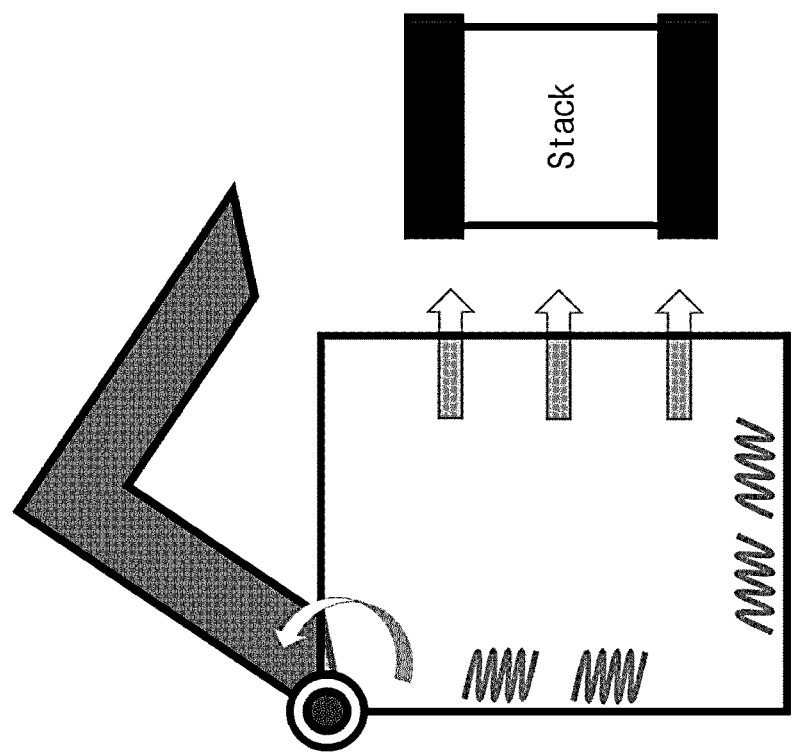
FIG. 6 schematically shows entering and exiting the fuel cell into and from the insulation box module (a) of the present invention.
Figure 6:
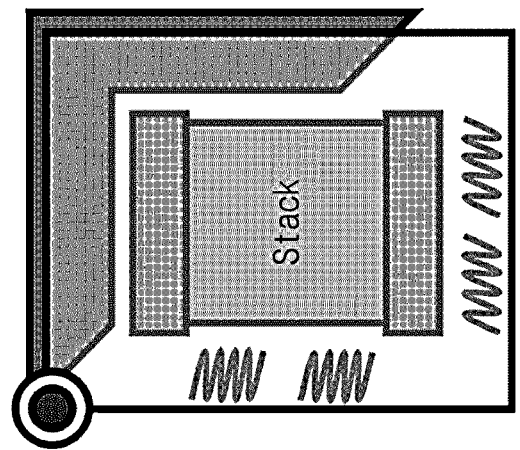

Specifically, the insulation box of the insulation box module (a) has a structure that includes the rectangular parallelepiped stack, the upper manifold, the lower manifold, and the heating element inside an insulation panel. The upper part of the insulation box and the front part toward the electrical equipment side are configured to be open and closed, and through this opening and closing, it is possible to enter and exit the stack, the upper manifold, and the lower manifold into and from the insulation box (see FIG. 6).

The heating element is located on three sides excluding a side (a side toward the electrical equipment side) with a connection pipe to the BOP module among four walls of the rectangular parallelepiped insulation panel, and also located on the floor. That is, heat sources are provided on three walls and the floor (see FIGS. 3 and 6).

The electrical wiring that operates the heating element is installed in the lower floor space outside the insulation box and is connected to an ESS device of the BOP module to receive power.

The power produced from the stack is controlled by an invertor of the BOP module through an air electrode collector plate and a fuel electrode collector plate and is delivered to the ESS device and stored.

As shown in FIG. 4, the stack structure has cells stacked between the upper manifold and the lower manifold, and the electrode collector plates protrude from the upper and lower ends of the stacked cells, respectively.

Figure 5:
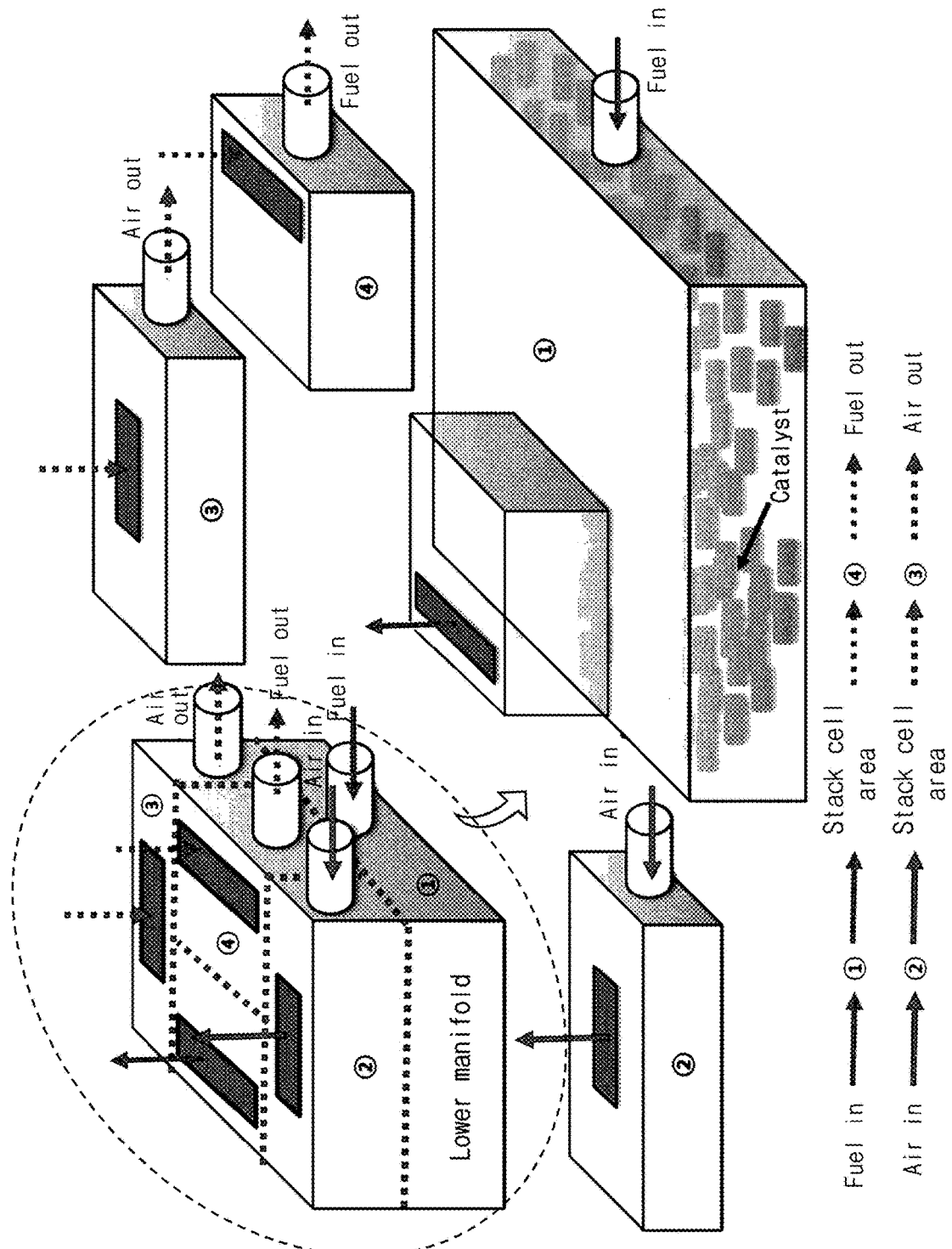
FIG. 5 schematically shows the lower manifold structure of the high-temperature fuel cell stack of the present invention and the fuel supply and air supply in the lower manifold.

As shown in FIG. 5, the lower manifold of the stack is internally divided into four areas. Areas 2 and 3 are the inlet and outlet of air, respectively. The air is supplied through tube 2 and then delivered to the air electrode area of the stack, and the spent air exhaust gas is delivered to tube 3 and discharged through tube 3. Tubes 1 and 4 are the inlet and outlet of fuel (ammonia), respectively. The fuel is supplied through tube 1 and then delivered to the stack through the catalyst filled therein, and the exhaust gas of the fuel used in the stack is delivered to tube 4 and discharged through tube 4.

Tubes 1 and 4 of the lower manifold are the inlet and outlet of fuel (ammonia), respectively. The fuel comes in from the outside through tube 1 and is discharged into the stack. Tube 1 occupies the largest space in the manifold and is filled with a catalyst material. Therefore, before the supplied ammonia is delivered to the stack, the catalyst material decomposes the ammonia into hydrogen and nitrogen, so that the efficiency of the stack is improved by an increase in the hydrogen partial pressure of the fuel.

That is, the reforming heat source required for ammonia decomposition may be provided from tubes 3 and 4 through which the high-temperature exhaust gas in the lower manifold passes, and also provided from the heating element on the bottom of the insulation box as shown in FIG. 3.

The balance of plant (BOP) module (b) is a supporting component and auxiliary system necessary for power generation, such as delivering energy in addition to the power generation device. The BOP module (b) includes an inert gas supply device 1, an ammonia supply device 2, a cooling water supply device 3, a stack air supply device 4, a discharge hot water processing device (not shown), heat exchangers 6-2 to 6-6, a current collect device 13, a heating element controller 14, an inverter 15 (a production power control device), an electrical balance of plant (E-BOP) 16, and the like (see FIG. 3).

The inert gas supply device 1 is a device that supplies inert gases such as Ar, N2, or He that do not react with metal at high temperatures to the fuel supply line of the stack 9 before the stack is operated. The supplied inert gas is to remove residual oxygen and impurities present in the fuel supply line of the stack that may react with ammonia and/or hydrogen supplied later.

The gas supplied from the inert gas supply device 1 is delivered to the heat exchanger 6-1, which is the lower manifold, and is heated by the lower heating element of the insulation box, and the inert gas supply device 1 operates until the operating start temperature of the system is reached.

The inert gas supply device 1 may use a flow pump or an MFC capable of controlling the flow rate.

The ammonia supply device 2 is a device that supplies ammonia to the system. A liquid or gaseous form with a purity of 99% or higher may be used, and a flow pump, an MFC, etc. may be used. When ammonia is used in liquid form, it is vaporized and supplied through a vaporizer 7. Heat from the exhaust gas may be supplied to the vaporizer 7 by the heat exchanger 6-1 and the heat exchanger 6-3.

The cooling water supply device 3 is a device that supplies water to cool the high-temperature exhaust gas discharged from the fuel cell stack, and a water valve, a flow meter, etc. may be used.

The stack air supply device 4 is a device that supplies air to the air supply line to supply oxygen to the stack. The air may be used in a state containing oxygen with an oxygen partial pressure of 0.2 or more, and an air blower, a flow pump, an MFC, etc. may be used.

The discharge hot water processing device 5 is a device that processes water used for cooling the high-temperature exhaust gas generated from the operation of the fuel cell before it is discharged to the outside.

Specifically, the water supplied from the cooling water supply device 3 is heated through heat exchange with the high-temperature exhaust gas in the heat exchangers 6-4 and 6-5. The hot water is collected in the discharge hot water processing device 5. The discharge hot water processing device 5 is also a place where water produced by cooling, through the heat exchanger 6-5, the water vapor in the exhaust gas generated from the stack are collected.

The heat exchangers 6-2 to 6-6 are devices for efficient thermal management of the BOP module by transferring heat from the heat exchanger 6-1 to each component of the BOP module. These heat exchangers may be of a shell and tube type, a double pipe type, or a plate type depending on their location and operating temperature range (see FIGS. 1 and 2).

The vaporizer 7 is a device that vaporizes liquid ammonia fuel to supply ammonia fuel as gas to the fuel supply line of the lower manifold. The heat exchanger 6-6 is located in the vaporizer. Heat raised by the exhaust gas of the lower manifold and the heating element is transferred through the heat exchangers 6-1 and 6-6 to operate the vaporizer.

The current collect device 13 (ESS device) is an energy storage device that collects and stores power generated from the fuel cell stack. The stored power may be sent to the outside to be used, or may be used as a power source for the E-BOP and as a heat source for the heating element of the insulation box module (a).

The E-BOP 16 is a device that performs program control of the system, and the invertor 15 is a device that controls power generation.

The ammonia-based SOFC system of the present invention as described above has a structure that the insulation box module (a) and the balance of plant (BOP) module (b) are connected by pipes and wires as shown in FIG. 3, and these modules may be separated during maintenance.

Additionally, the present invention provides a method of operating the ammonia-based solid oxide fuel cell (SOFC) system in which temperature rise by the heating element is applied.

This operating method is intended to generate power by the supply of ammonia and includes:

i) a first step of raising the temperature of the fuel cell stack to the operating start temperature by allowing heat from the heating element heat source to circulate throughout the fuel cell stack; and ii) after the first step, a second step of producing power, that is, applying current, by supplying ammonia to the fuel supply line of the lower manifold.

The first step is a purge and temperature rise step inside the fuel cell stack and the fuel supply line.

Specifically, in the first step, in order to purge the inside of the fuel cell stack and the fuel supply line, an inert gas is supplied to the fuel supply line of the lower manifold to remove residual oxygen and/or impurities that may exist inside the fuel cell stack and the fuel supply line.

The residual oxygen and impurities may react with ammonia, which is a fuel, and may cause a decrease in efficiency of power production using ammonia.

In order to raise the temperature of the fuel cell stack and the fuel supply line, the heating element heat source located under the lower manifold and on the three lateral sides of the stack:

① acts on the stack to raise the temperature of the stack to the operating start temperature, and ② acts on the lower manifold to raise the temperature of the air and the inert gas flowing through the air supply line and the fuel supply line of the lower manifold, respectively, so that heat from the heating element heat source is circulated throughout the fuel cell stack, and thereby the temperature of the fuel cell stack is raised to the operating start temperature.

The heating element heat source for the temperature rise receives power from the current collect device 13, and the degree of the heat source acting on the stack and the lower manifold is adjusted using the heating element controller 14.

The operating start temperature of the stack is about 600° C. or higher, preferably 650° C. to 700° C.

The three sides of the stack where the heating element heat source 12 is located refer to both lateral sides and the rear side, which are the remaining three sides of the stack except the front side where the stack faces the BOP module, among the four sides surrounding the stack.

Figure 1:
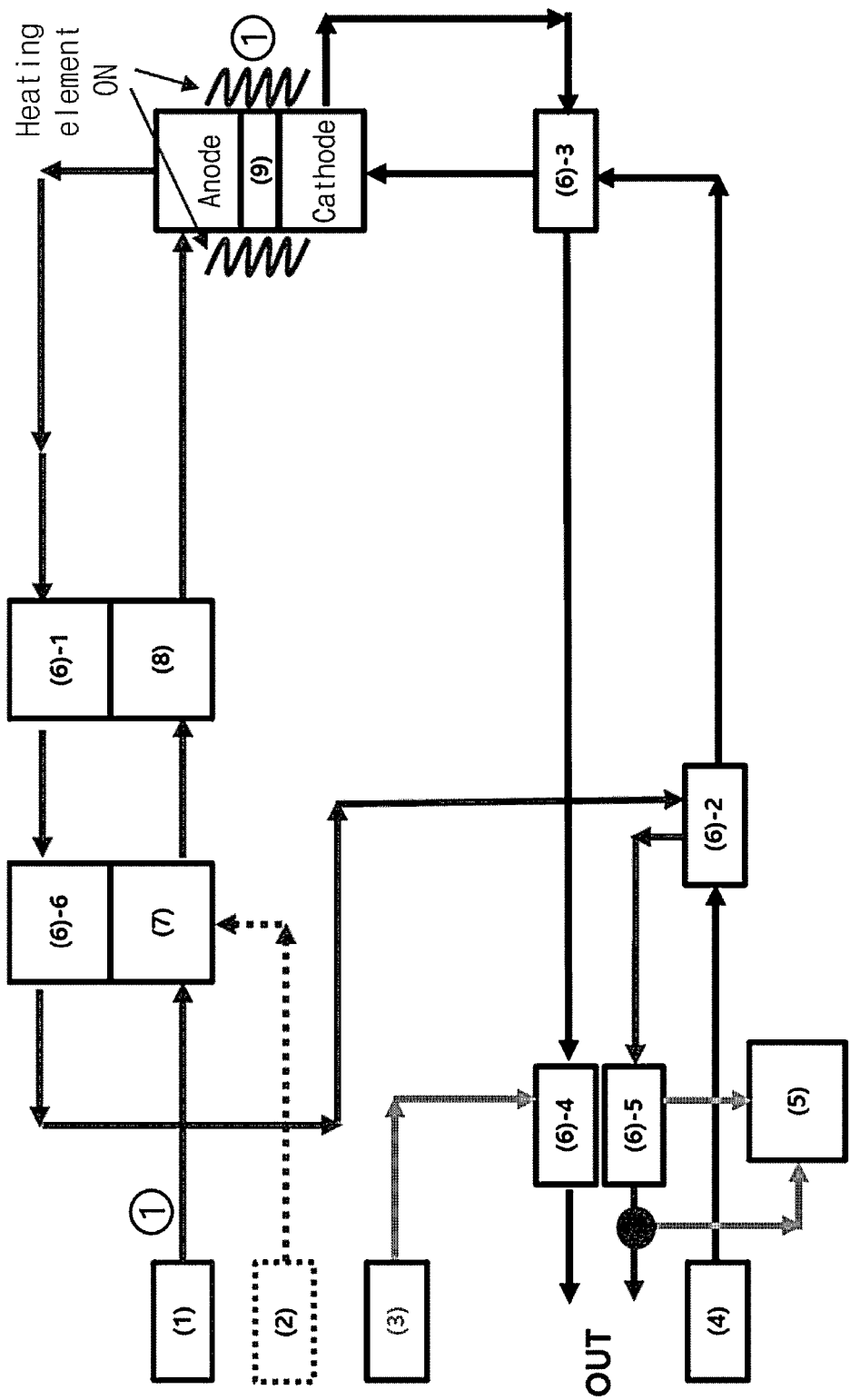
FIG. 1 schematically shows the flows of an ammonia fuel and air in an ammonia SOFC system in a heating element temperature rise step of each of fuel supply and air supply lines, which is the first step of the present invention.

Referring to FIG. 1, purge and temperature rise by flow of inert gas and air fluid are as follows.

In the fuel supply line for supplying the inert gas, the purge gas supplied from the inert gas supply device 1 in a room temperature environment passes through the vaporizer 7, the lower manifold 8, the anode area of the fuel cell stack, the heat exchanger 6-1 (integrated with the lower manifold 8) in which the lower manifold 8 itself acts as a heat exchanger), and the heat exchangers 6-6, 6-2, and 6-5 in order and is then discharged to the outside.

In the air supply line, the air is supplied from the stack air supply device 4 in a room temperature environment, and the supplied air moves in the order of the heat exchanger 6-2, the heat exchanger 6-3, and the cathode area of the fuel cell stack, passes through the heat exchanger 6-3 again, passes through the heat exchanger 6-4, while being cooled, and is then discharged to the outside.

The second step is a step of producing power.

Referring to FIG. 2, in the second step, ammonia is supplied to the fuel supply line of the lower manifold, and the stack whose temperature is raised in the first step begins to operate and produces power.

After the stack begins to operate, the stack can reach the continuous normal operating temperature of 700° C. to 750° C. without the heat source of the heating element due to heat generated by the electrochemical reaction that occurs during power production through continuous operation.

As such, when the stack reaches the continuous normal operating temperature, the power applied from the current collect device 13 to the heating element of the first step is gradually adjusted to maintain the temperature of the stack at 700° C. to 750° C.

Meanwhile, the inside of the fuel supply line of the lower manifold is filled with a catalyst for ammonia reforming, so that after raising the temperature of the fuel supply line in the first step, ammonia is reformed in the fuel supply line when ammonia is supplied in the second step.

Referring to the ammonia flow (denoted by solid line) in the second step as shown in FIG. 2, the supply of inert gas to the fuel supply line is stopped and converted to the supply of ammonia from the ammonia supply device 2. In case where ammonia to be supplied is liquid, liquid ammonia is supplied to the vaporizer 7, vaporized, and decomposed into hydrogen and nitrogen in the fuel supply line of the lower manifold.

The decomposed mixed gas is supplied to the anode area of the fuel cell stack and used as fuel for power production. In addition, since carbon deposition does not occur when ammonia fuel is supplied, steam is not supplied to the lower manifold 8.

The high-temperature exhaust gas discharged from the stack passes through the heat exchangers 6-4 and 6-5 for heat exchange with water supplied from the cooling water supply device 3 for efficient heat management. As a result, the supplied water can be converted into hot water and utilized.

Specifically, in the second step, when the fuel cell stack is heated to 600° C. or higher (preferably 600° C. to 700° C.) by the heat source of the heating element, the inert gas supply from the inert gas supply device 1 to the fuel supply line is blocked, and the ammonia fuel is instead supplied from the ammonia supply device 3.

If the supplied ammonia is in liquid form, it is vaporized through the vaporizer, supplied to the fuel supply line of the lower manifold, and decomposed into hydrogen and nitrogen by the catalyst filled in the fuel supply line. The decomposed hydrogen is used as an operating fuel for power production through a chemical reaction in the anode area of the fuel cell stack.

After operation of the fuel cell for power production, unreacted hydrogen including moisture (water vapor) and nitrogen gas discharged from the stack move to the heat exchanger 6-1, which is the lower manifold, and the heat exchanger 6-6.

At this time, the temperature inside the insulation box module is raised because of the chemical reaction heat generated during operation in the anode area of the fuel cell stack, and this raises the temperature of the fuel and air inside the insulation box module. Accordingly, power consumption for the heating element is greatly reduced. The heated fuel and air move to the heat exchanger 6-1 and the heat exchanger 6-6, where heat is transferred to the fuel supply line and the vaporizer, thereby causing an ammonia decomposition reaction and ammonia vaporization, respectively.

The exhaust gas in the fuel supply line of the stack that has passed through the heat exchanger 6-1 and the heat exchanger 6-6 raises the temperature of the air being supplied to the air supply line of the stack from the stack air supply device 4 to 600° C. or higher while passing through the heat exchanger 6-2. Meanwhile, the exhaust gas in the fuel supply line of the stack that has passed through the heat exchanger 6-2 passes through the heat exchanger 6-5 and is discharged to the outside.

The air is supplied from the stack air supply device to the air supply line for the air flow in the second step, is heated to over 650° C. by the heat exchanger 6-2, passes through the heat exchanger 6-3, and moves to the cathode area of the fuel cell stack.

When the moved air is operated in the stack, oxygen in the air is consumed and discharged as nitrogen gas with a low oxygen concentration. At this time, it absorbs some of the chemical reaction heat generated in the anode area and is discharged. The discharged nitrogen gas again passes through the heat exchanger 6-3, passes through the heat exchanger 6-4, and is discharged to the outside.

When the supply of inert gas is switched to the supply of ammonia as described above, the cooling water supply device functions to lower the exhaust gas temperature of the fuel supply line and the air supply line through the heat exchanger 6-4 and the heat exchanger 6-5. At this time, the water 5 that has absorbed the heat can be stored through the discharge hot water processing device and used as hot water.

Although the present invention has been described hereinbefore through embodiments, these embodiments are illustrative only and not limiting. Those of ordinary skill in the technical field to which the present invention pertains will understand that various changes and modifications can be made according to the theory of equivalents without departing from the subject matter of the present invention and the scope of the appended claims.

The present invention is the result of a research project of the 'Hydrogen secondary battery material component technology development (R&D) support project' (Project name: Development of ammonia-based solid oxide fuel cell electrode material and cell manufacturing technology, Project number: CBTP-B-20-04-R001, Research period: 2021.11.01.~2022.10.31) supported by Chungcheongbuk-do, Republic of Korea and conducted solely by Wonik Materials Co., Ltd.

INDUSTRIAL APPLICABILITY

As described above, the present invention that relates to the ammonia-based solid oxide fuel cell (SOFC) system in which temperature rise by the heating element is applied and also relates to method of operating the same can contribute to improving the performance and mobility of fuel cells for the use of ammonia fuel in the ammonia-based SOFC system for small power generation such as distributed power generation. Therefore, the industrial applicability of solid oxide fuel cells for ammonia fuel is high.

The invention claimed is:

1. An ammonia-based solid oxide fuel cell (SOFC) system in which temperature rise by a heating element is applied, the system comprising:
   an insulation box module (a); and
   a balance of plant (BOP) module (b),
   wherein the insulation box module (a) is a part related to power generation and includes a fuel cell stack (9), an upper manifold (10), a lower manifold (8), a heating element (11), and a conductor wire (12) for the heating element to supply electricity to the heating element (11),
   wherein the lower manifold (8) is provided at a bottom side of the fuel cell stack (9), and the upper manifold (10) is provided at a top side of the fuel cell stack (9),
   wherein the heating element (11) is provided on more than one sides of the fuel cell stack except a front side where the fuel cell stack faces the BOP module for supplying heat to the fuel cell stack, and further provided under the lower manifold for supplying the heat to the lower manifold, and
   wherein the lower manifold includes a fuel supply line, an air supply line, a fuel discharge line and an air discharge line such that ammonia and air are configured to be supplied to the fuel cell stack through the lower manifold and discharged from the fuel cell stack through the lower manifold, and the ammonia supplied is decomposed into hydrogen and nitrogen by ammonia decomposition catalyst filled in the fuel supply line.

2. The ammonia-based SOFC system of claim 1, wherein the balance of plant (BOP) module (b) is a supporting component and auxiliary system necessary for power generation, such as delivering energy in addition to a power generation device, and includes an inert gas supply device (1), an ammonia supply device (2), a cooling water supply device (3), a stack air supply device (4), a discharge hot water processing device (5), heat exchangers 6-2 to 6-6 (6), a current collect device (13), a heating element controller (14), and an inverter (15).

3. The ammonia-based SOFC system of claim 1, wherein said more than one sides of the fuel cell stack are both lateral sides and a rear side, which are remaining three sides of the fuel cell stack except the front side where the fuel cell stack faces the BOP module, among four sides surrounding the stack.

4. The ammonia-based SOFC system of claim 1, wherein the catalyst contains non-metals and noble metals.

5. The ammonia-based SOFC system of claim 1, wherein the insulation box module (a) and the balance of plant (BOP) module (b) are connected by pipes and wires, and configured to be separated during maintenance.

6. A method of operating the ammonia-based solid oxide fuel cell (SOFC) system of claim 1, the method comprising:
   raising, by the heating element, a temperature of the fuel cell stack to an operating start temperature and of the fuel supply line and the air supply line provided in the lower manifold;
   purging the fuel cell stack and the fuel supply line, by supplying an inert gas through the fuel supply line, of residual oxygen and/or impurities that may exist inside the fuel cell stack and the fuel supply line,
   wherein the inert gas is configured to be heated by the heating element and circulate the fuel cell stack, whereby the inert gas raises the temperature throughout the fuel cell stack.

7. The method of claim 6, wherein the operating start temperature of the fuel cell stack is 600° C. or higher.

8. The method of claim 6, further comprising:
   ii) producing power by supplying the ammonia to the fuel supply line of the lower manifold,
   wherein during power production through continuous operation, a current collect device (13) is configured to supply a part of the power to the heating element, and the heating element is gradually adjusted to maintain the temperature of the fuel cell stack at 700° C. to 750° C.

9. The method of claim 8, wherein the ammonia is reformed in the fuel supply line by an ammonia decomposition reaction.

\* \* \* \* \*